United States Patent [19]

Flickner et al.

[11] Patent Number: 4,791,676
[45] Date of Patent: Dec. 13, 1988

[54] METHOD AND MEANS FOR EFFICIENTLY HANDLING BOUNDARY CONDITIONS IN CONNECTED COMPONENT LABELING

[75] Inventors: Myron D. Flickner; Kottappuram M. Ali Mohiuddin, both of San Jose, Calif.

[73] Assignee: International Business Machines Corporation, Armonk, N.Y.

[21] Appl. No.: 148,169

[22] Filed: Jan. 22, 1988

Related U.S. Application Data

[63] Continuation of Ser. No. 775,460, Sep. 12, 1985, abandoned.

[51] Int. Cl.$^4$ .............................................. G06K 9/46
[52] U.S. Cl. ...................................... 382/26; 382/22; 382/41
[58] Field of Search ............... 382/26, 41, 48, 19, 382/22, 25, 9, 27; 358/107

[56] References Cited

U.S. PATENT DOCUMENTS

| | | | |
|---|---|---|---|
| 3,408,485 | 2/1965 | Scott et al. | 235/92 |
| 3,889,234 | 6/1975 | Makihara et al. | 382/26 |
| 4,069,411 | 1/1978 | Morton | 382/26 |
| 4,115,804 | 9/1978 | Morton et al. | 358/107 |
| 4,183,013 | 1/1980 | Agrawala et al. | 340/146.3 |
| 4,189,711 | 2/1980 | Frank | 382/26 |
| 4,484,346 | 11/1984 | Sternberg et al. | 382/41 |
| 4,624,013 | 11/1986 | Urushibata | 382/48 |
| 4,630,306 | 12/1986 | West et al. | 382/26 |
| 4,630,307 | 12/1986 | Cok | 382/22 |

OTHER PUBLICATIONS

"Sequential Operations in Digital Picture Processing", by Asriel Rosenfeld and John L. Pfaltz, Journal of the Association for Computing Machinery, vol. 13, No. 4 (Oct. 1966), pp. 471–494.
PAL-Programmable Array Logic Handbook (Third Edition), by John M. Birkner & Vincent J. Coli, 1983 Monolithic Memories, pp. 1-4-1-16; 4-2-4-11.
IBM Research Report "On the Reuse of Label Locations in Real Time Component Labelling of Images", by Amelia C. Fong, 12/2/83.
IBM Research Report "An Optimal Component Labelling Algorithm with Label Merging", by Amelia C. Fong, 2/17/84.

Primary Examiner—Leo H. Boudreau
Assistant Examiner—Joseph Mancuso
Attorney, Agent, or Firm—Brown, Martin, Haller & Meador

[57] ABSTRACT

A method and means for analyzing and labeling picture elements (pixels) in a raster-scanned image includes utilizing a fixed pixel labeling priority rule that takes into account near-neighbor frame border pixels that are not included in the currently-viewed portion of the image by substituting the inverse of the value of the current image pixel being labeled in place of undefined border pixels outside the viewed image portion.

13 Claims, 4 Drawing Sheets

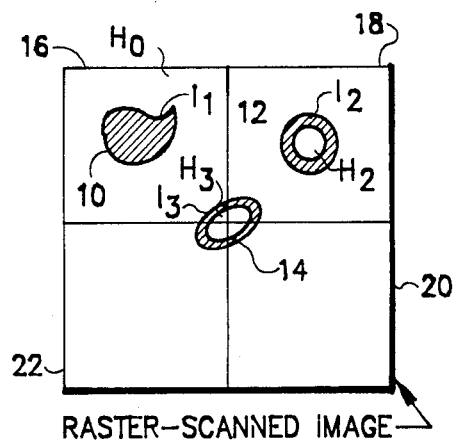
RASTER-SCANNED IMAGE
FIG. 1
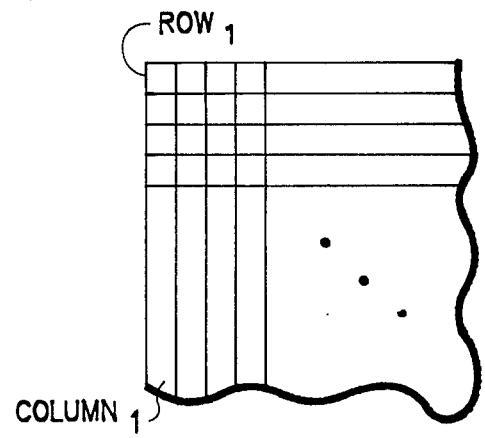
NXM RASTER MATRIX FORMAT
FIG. 2
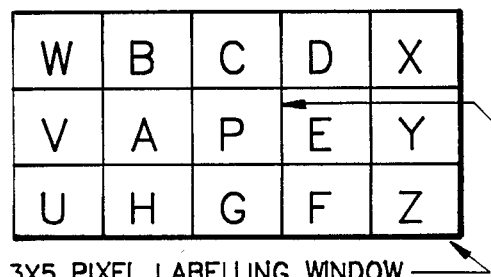
3X5 PIXEL LABELLING WINDOW
FIG. 3
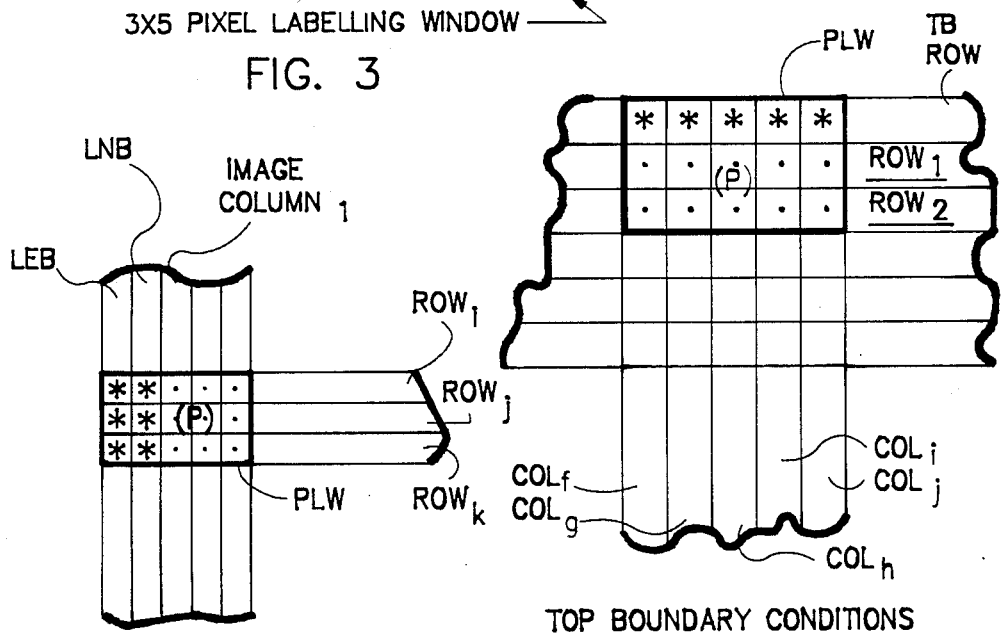
LEFT BOUNDARY CONDITIONS
FIG. 4A
TOP BOUNDARY CONDITIONS
FIG. 4B

METHOD AND MEANS FOR EFFICIENTLY HANDLING BOUNDARY CONDITIONS IN CONNECTED COMPONENT LABELING

This is a continuation of application Ser. No. 775,460, filed Sept. 12, 1985, now abandoned.

BACKGROUND OF THE INVENTION

The invention relates to the analysis and labeling of individual picture elements (pixels) of a raster-scanned image by utilizing a fixed labeling priority rule, and more particularly to the labeling of pixels positioned adjacent the borders of a raster-scanned image frame.

Automated recognition of objects in raster-scanned images is aided by the technique of connectivity analysis in which the pixels forming a particular object in the scanned image are assigned the same label. An operation for labeling image object pixels was originally set forth by Rosenfeld and Pfaltz in "Sequential Operations and Digital Picture Processing," *Journal Of ACM*, vol. 14, no. 4, October 1966, pp. 471–494. U.S. Pat. No. 4,183,013 to Agrawala et al. exemplifies a pixel labeling scheme.

With respect to pixel labeling, the pixels forming a given object are said to be connected, and the Rosenfeld reference teaches that the labeling of image pixels involves the two steps of analyzing the connectivity of pixels in the image and labeling of pixels in analyzed image regions.

Pixel connectivity analysis is typically handled by the examination of a neighborhood of pixels surrounding a pixel to be labeled, with the currently-analyzed pixel assigned the value of one of the neighborhood pixels according to a predetermined priority scheme. Using the prioritized neighborhood, the pixels of a raster-scanned image can be analyzed and labeled in the sequence in which they are generated.

Typically, the viewed portion of a raster-scanned image consists of a window that is framed over a larger pixel matrix, so that the viewed portion is surrounded by "undefined pixels" not actually belonging to the viewed image. These undefined pixels are not labeled. However, when the currently-analyzed pixel is adjacent the edge of the viewed portion, the neighborhood employed for its analysis and labeling includes undefined pixels lying outside the framed image window.

When analyzing and labeling pixels on the edge of the viewed portion of a scanned image, previous label selection priority schemes are forced to maintain a set of specialized priority rules, each employed at a respective one of the boundaries of the viewed image. This makes the labeling process difficult, with the challenge being to find an efficient, simplified way of accommodating image boundary conditions so that the undefined pixels do not lead to ambiguous results in component labeling or to complex labeling algorithms.

The ambiguity arises in connectivity labeling schemes from the fact that undefined pixels contain no image information that validly relates them to the pixels forming the currently-viewed portion of an image. Assignment of an arbitrary value to undefined pixels can result in the assignment of an incorrect label to an image boundary pixel if the image boundary pixel's label is selected on the basis of an undefined pixel to which the connectivity scheme determines the image pixel is connected.

Many labeling schemes (such as the Agrawala one referenced previously) employ complex software constructs for pixel analysis and labeling; these are relatively slow-acting and inappropriate for use in high-speed sequential processing such as is implemented in pipelined systems.

Accordingly, the principal object of the present invention is to provide for the unambiguous labeling of image boundary pixels during connected pixel labeling of the image in a sequential manner utilizing a fixed priority rule.

An advantage conferred by achieving this objective is that component labeling according to the present invention can be speedily and efficiently done on a sequential basis, making it particularly suited for high speed pipelined hardware implementation.

SUMMARY OF THE INVENTION

The present invention provides, in the analysis of frames of raster-scanned images, a method and means for connected pixel labeling of an image frame in a sequential manner utilizing a fixed labeling priority rule.

The method includes analysis of the connectivity of each pixel in a black/white image frame by sequential examination of the color match of each pixel with respect to its adjacent neighbors within a predetermined neighborhood. Each analyzed pixel is labeled such that the same label is assigned to each pixel within a maximally connected group of pixels within the image frame, with any given pixel being labeled according to a fixed priority rule in the event that at least two causal neighbors within the neighborhood have the same color match. At the image frame boundary neighborhoods including undefined neighbor pixels, the inverse of the value assigned the pixel being labeled is substituted in the places of the undefined neighbor pixels.

The invention is also expressed in the form of an apparatus for analyzing and labeling fixed frames of a raster-scanned image and labeling connected pixels of an image frame in a sequential manner utilizing the same fixed priority rule.

The apparatus includes a pixel labeling window register for defining a fixed size pixel window for each pixel in a sequence of pixels forming a raster-scanned black/white image. A pixel labeling circuit responds to the values of pixels in each window by labeling each pixel such that the same label is assigned to each pixel within a maximally connected group of pixels within an image frame, any given pixel being labeled by the pixel labeling circuit according to a fixed priority rule in the event that at least two causal neighbors in the given pixel's window have the same color match. The apparatus further includes pixel value substitution logic for, when a window defined by the pixel labeling circuit contains undefined pixels, substituting, in the places of the undefined pixels, the inverse of the value assigned the pixel being labeled.

Therefore, the summarized method and apparatus meet the stated objective by removing undefined pixels from the analysis and labeling of a pixel by insuring that they are assigned color values that do not match the value of the pixel being labeled.

Other objectives and advantages of the present invention will become apparent when the following detailed description is read in conjunction with the below-described drawings.

BRIEF DESCRIPTION OF THE DRAWINGS

FIG. 1 represents a raster-scanned image containing three image objects and four frames.

FIG. 2 is a magnified view of a portion of a raster-scanned image frame illustrating the matrix arrangement of pixels in the image.

FIG. 3 illustrates a preferred component labeling window used in analyzing and labeling the sequence of pixels forming a raster-scanned image.

FIGS. 4A and 4B illustrate three separate boundary conditions accounted for by the invention in the analysis and labeling of pixels.

DETAILED DESCRIPTION OF THE PREFERRED EMBODIMENT

Figure 5:
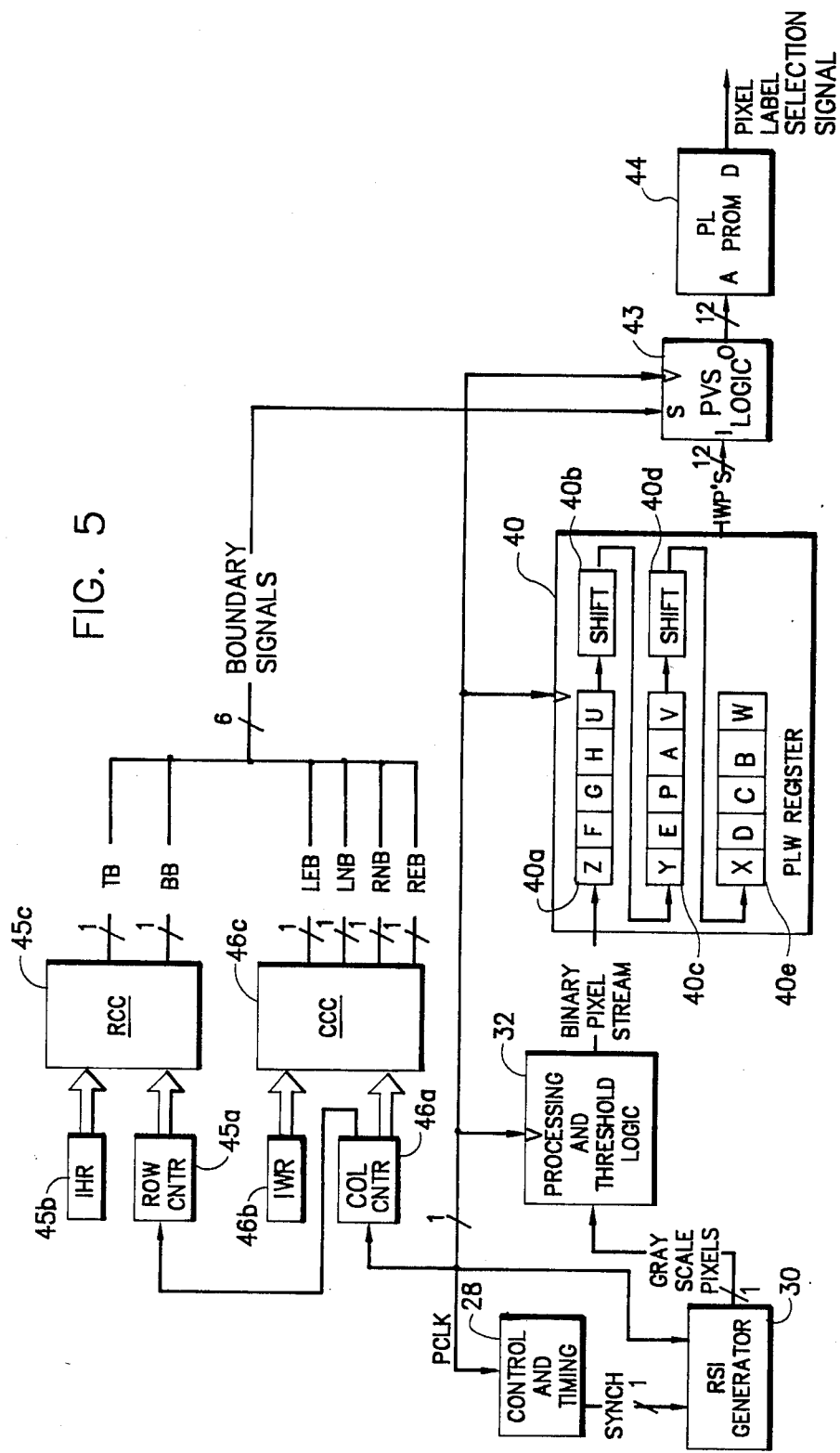
FIG. 5 is a block diagram illustrating the use of the invention in a pixel labeling system.

Refer to FIG. 1 for an understanding of object recognition in a black/white raster-scanned image. In the raster-scanned image of FIG. 1, identification of objects 10, 12, and 14 can be accomplished at a low level of image abstraction by providing the pixels connected to form a respective object with identical labels to differentiate them from pixels forming another, different object.

In this regard, pixels (picture elements) are the elemental image regions that are presented for viewing in an ordered $N \times M$ matrix format which is represented by the matrix fragment of FIG. 2. The matrix of pixels is formed by scanning a scene in a vertically ordered sequence of horizontal sweeps forming a raster, and quantizing the scene information at regular intervals in each sweep to provide a succession of pixels. A sweep is conventionally referred to as a scanline and an image is reconstructed from a swept scene by presenting the scanlines in the sequence with which they were generated. The separation of each scanline into a sequence of pixels and the presentation of each scanline adjacent the scanline following it naturally imposes the matrix format of FIG. 2. The matrix structure (conventionally scalled a raster-scanned format) has N rows (each corresponding to a respective scanline), each made up of a sequence of M pixels. The matrix thus includes M columns of vertically adjacent pixels and is referred to as an "$N \times M$ matrix." In the discussion following, whenever a pixel or image matrix is referred to, it is to be considered an $N \times M$, raster-scanned matrix of pixels.

Referring to FIG. 1, the objective of an image analysis application is to analyze and identify the pixels of an image according to the respective image objects that they form. To facilitate the identification, each pixel is assigned one of a pair of binary values by comparing it against a preset level. If a pixel meets or exceeds the level it is assigned a color value of 1, indicating that it is connected to other, as yet unidentified pixels, to form an image object. Pixels that fall below the preset level are assigned to make up the image background or holes in objects. Since these pixels do not form part of an image object they are assigned the second binary value 0.

In FIG. 1 all of the pixels forming the background upon which the image objects 10, 12, and 14 are presented are assigned the label $H_0$ by the labeling application process, with the H indicating their pixel value (0) and the subscript indicating their inclusion in the background. The pixels forming the image object 10 are assigned the label $I_1$, while the image pixels of the object 12 are assigned the label $I_2$ to distinguish them from the image pixels of the object 10 that have the same binary value. In these cases, the I portion of the label indicates the original assignment of a 1 to such pixels.

The labeling of pixels associated with the image object 12 (a circular ring) must also include labeling the pixels in the hole of the middle of the ring to distinguish them from the background pixels $H_0$. The hole pixels in the image object 14 are therefore assigned the label $H_2$.

The resolution requirements of many image analysis applications are such that the entire image cannot be encompassed in one field of view. What is often done in such cases is to scan the image in frames, analyze the frames separately, and then combine the results from the different frames to form a composite description of the image. For example, in FIG. 1 the oval-shaped ring (image object 14) has portions in each of four abutting image frames 16, 18, 20, and 22. Although the pixels for the four portions of the object 14 will be initially labeled separately, it is to be understood that the application process analyzing the image of FIG. 1 will have means to piece together the differently-labeled object portions into an integrated image object. Proper merging of the portions of the object 14 requires unambiguous labeling of the pixels in each of its sections. With further particularity, the labeling scheme must insure that the hole pixels of the object 14 are assigned H labels distinguishable from the H label assigned backgroundd pixels in the image of FIG. 1. This characterizes the problem solved by the method and apparatus of the invention.

Refer to FIG. 3 now for an understanding of how connected pixels in an image are labeled by neighborhood analysis. In the invention, the current pixel being analyzed and labeled is denoted by P. A $3 \times 5$ window of pixels surrounding the current pixel P being examined and labeled is used to analyze its connectivity to adjacent pixels.

The $3 \times 5$ pixel labeling window used in pixel labeling has a first component of 8 pixels A-H that immediately surround the current pixel P in a basic $3 \times 3$ pixel square that is framed on each end by a $3 \times 1$ pixel stack. The $3 \times 5$ window is used to establish the connectivity relation between the current pixel P and the image pixels that have already been labeled. In the following portion of the discussion, the pixels in the pixel labeling window are referred to as the "neighbors" of P.

In the labeling scheme, if P has the same value as one of its connected neighbors in the pixel window, then P will be assigned the label of this neighbor. Since there may exist more than one connected neighbor, a priority sequence is followed for selecting the label to be assigned P. The preferred priority sequence for purposes of understanding the invention is: label (A)>label (B)>label (C)>label (D)>label (V)>label (X).

In connectivity analysis, A, B, C, D, V, and W are referred to as P's causal neighbors. Given the general left-to-right and top-to-bottom path of raster image scanning, a relational history of these causal neighbors can be accumulated by the labeling application to provide a reliable basis for making a decision concerning their connectivity to P.

Refer now to FIG. 4A for consideration of a pixel labeling window (PLW) adjacent the left edge of an image frame. Initially, it is to be understood that the frame defining an image to be viewed does not necessarily include all of the pixels in the image, and that undefined pixels lie adjacent the perimeter of the image frame, yet do not belong to the image. Thus, when P is adjacent the edge of the frame, the priority selection scheme will not work accurately. For example, when, as in FIG. 4A, P (defined by the intersection of column$_I$ and row$_j$) is at the left perimeter of an image frame, the first two columns of the PLW will contain "undefined pixels" (indicated by "*"), while the remaining three columns will all have pixels defined with respect to the image frame being analyzed (indicated by "."). Therefore, the PLW in FIG. 4A falls on the left extreme boundary (LEB). If the PLW is relocated by one pixel to the right in FIG. 4A, then the neighbors U, V, and W will still be undefined; this location is referred to as the left near boundary (LNB). It should be noted that corresponding boundary conditions exist on the right-hand edge of the raster-scanned image; these are referred to as right extreme boundary (REB) and right near boundary (RNB).

In FIG. 4B, P lies at the intersection of the first row of the raster matrix, row$_I$, and column$_h$. Therefore, the top row of the PLW contains undefined pixels and is said to lie in the top boundary (TB). A corresponding bottom boundary (BB) of undefined pixels borders the bottom edge of the raster matrix.

In view of the described boundaries, and, assuming that the image frame matrix is larger than or equal to the component labeling window, 15 distinct boundary conditions must be accounted for when analyzing and labeling P. These conditions are given in Table I.

TABLE I

| BOUNDARY CONDITION | BOUNDARY CONDITION DEFINING SIGNALS |
| --- | --- |
| 1 | LEB.$\overline{TB}$.$\overline{BB}$ |
| 2 | LEB.$\overline{TB}$.BB |
| 3 | LEB.TB.$\overline{BB}$ |
| 4 | LNB.$\overline{TB}$.$\overline{BB}$ |
| 5 | LNB.$\overline{TB}$.BB |
| 6 | LNB.TB.$\overline{BB}$ |
| 7 | REB.$\overline{TB}$.$\overline{BB}$ |
| 8 | REB.$\overline{TB}$.BB |
| 9 | REB.TB.$\overline{BB}$ |
| 10 | RNB.$\overline{TB}$.$\overline{BB}$ |
| 11 | RNB.$\overline{TB}$.BB |
| 12 | RNB.TB.$\overline{BB}$ |
| 13 | TB.$\overline{LEB.LNB.REG.RNB}$ |
| 14 | BB.$\overline{LEB.LNB.REB.RNB}$ |

TABLE I-continued

| BOUNDARY CONDITION | BOUNDARY CONDITION DEFINING SIGNALS |
| --- | --- |
| 15 | $\overline{TB.BB.LEB.LNB.REB.RNB}$ |

For example, condition 1 defines the condition where P is adjacent the left extreme boundary and in neither the top left-hand nor the top right-hand corner of the raster matrix. Condition 5 corresponds to P being located in the bottom row (row$_n$) and second column (col$_2$) of the matrix. Condition 13 obtains whenever the PLW is located such that P is in row$_I$ of the raster matrix and the PLW is not adjacent either the left or right extreme or near boundaries. Under condition 15, no pixels in the PLW are undefined.

Returning again to the example of FIG. 4A, the practice of the invention requires that, for each of the boundary conditions 1–14, the inverse of the value of P be assigned arbitrarily to the undefined pixels in the PLW. This will remove the undefined pixels from inclusion in the above-described pixel labeling scheme, and remove any possibility of ambiguity in the labeling of pixels positioned adjacent the periphery of a raster-scanned image frame.

An apparatus for performing the above-described method can be understood with reference to FIG. 5. In FIG. 5 a conventional video control and timing circuit 28 produces a SYNCH signal to synchronize raster scanning and a pixel clock (PCLK) having the frequency of pixel occurrence in a row of a raster-scanned image. A raster-scanned image (RSI) generator 30 conventionally produces an image signal consisting of a stream of quantized, gray-scale image pixels in a standard raster-scanned format, with a new image pixel produced with each cycle of PCLK. Conventional pixel processing and threshold logic 32 compares each pixel in the input pixel stream against a predetermined level to derive the binary characteristic for the pixel. The output of the pixel measurement logic 32 is provided as a stream of binary pixels, each having only an image (1) or hole (0) value.

The pixel stream produced by the pixel measurement logic 32 is fed to a set of pixel labeling window (PLW) registers 40 which frame the PLW for each pixel of the raster-scanned image that is to be labeled. The registers are conventional, serially-connected shift registers which shift the pixels of an N×M image frame pixel matrix serially at the frequency of PCLK. The image window registers 40 include a first register 40a having a 1×5 pixel capacity. The 5-pixel register 40a is connected to a shift register 40b having the capacity to store and serially shift M-5 pixels. These registers 40a and 40b together have the capacity for storing 1 row of M pixels. The register 40b shifts pixels into another 1×5 pixel register 40c. The register 40c is connected to shift pixels into a register 40d, equivalent in all respects to the register 40b. Finally, the register 40d shifts pixels to a third 1×5 pixel shift register 40e.

As pixels are shifted serially through the PLW registers 40, the pixels held in locations F, G, and H of register 40a, the pixels in positions V, A, P, and E of register 40c, and the pixels in positions B, C, D, and X of register 40e are provided, once each cycle of PCLK, on the twelve output lines labeled IWP's (corresponding to image window pixels).

The IWP's are fed to a pixel value substitution logic (PVS logic) circuit 43 which detects the current boundary condition and which, if necessary, also substitutes the inverted value of P for the pixels that are undefined under the current boundary condition.

In response to boundary condition 15 of Table I, the PVS logic circuit 43 forwards all of the IWP's obtained from the PLW registers 40 to a pixel labeling (PL) PROM 46. Under each of conditions 1-14, the PVS logic circuit 43 forwards the values of defined pixels together with the inverse value of P in place of the undefined pixels.

The PL PROM 44 is programmed to implement the labeling scheme described above, using the 12 forwarded pixels to address a storage location indicating which of the labels is to be assigned to P.

The operations of the PVS logic circuit 43 and the PL PROM 44 are synchronized through provision of PCLK.

The current boundary condition obtaining for a raster-scanned image is provided by a top/bottom boundary (TBB) detection circuit embracing components 45a, 45b, and 45c, and a right/left boundary detection circuit including components 46a, 46b, and 46c. The top/bottom boundary detection circuit includes a row counter 45a that identifies the number of the current row being scanned by counting up in response to the column counter described below. The current row count from the row counter 45a is compared against a value contained in a presettable image height register (IHR) 45b, the comparison being done by a row count comparator (RCC) 45c. The RCC operates as follows: when the row counter 45a begins counting from 0, the comparator 45c provides the top boundary (TB) signal. The row count is incremented each time the column counter reaches a count of M. Then, when the row counter and IHR values are equal, the comparator 45c provides the bottom boundary (BB) signal. In the preferred embodiment, the IHR 45b is set to N, so that BB is activated when the row count reaches N. The row counter 45a is reset upon reaching N and begins counting again from 0. In this regard, a signal to reset the row counter can be provided from the RCC 45c.

Raster matrix columns are counted by a column counter 45a that is reset at the beginning of each scan-line and incremented thereafter by PCLK. The current count of the counter 46a is compared against the width in pixels of the raster-scanned image as represented by a value in an image width register (IWR) 46b. A column count comparator (CCC) 46c compares the output of the counter 46a against the image width available from the register 46b. In keeping with the defined matrix structure, the IHR 46b is set to M and the column counter 46b counts PCLK cycles from 0 to M. The column counter 46b is reset when it reaches M; each time the column counter is reset, the row counter is incremented.

The comparator 46c compares the preset count in the register 46b with the current column count in the counter 46a and at the appropriate time provides the signals LEB, LNB, RNB, or REB.

It should be evident that the boundary signals TB, BB, LEB, LNB, RNB, and REB are all synchronized by PCLK to the shifting of pixels through the PLW registers 40. The boundary signals indicate the presence in the PLW registers of undefined pixels from previous pixel rows in the same frame or the immediately preceding or succeeding frame. Thus, when TB and LEB are activated, indicating boundary condition 1, undefined pixels, corresponding to the pixels forming the bottom row of the preceding interation of the current frame, will occupy the PLW registers 40 from position A in register 40c through position W in register 40e. The values for M defined pixels (corresponding to the first row of the present scanned iteration of the current frame) will be contained in the PLW registers from storage position P backward through position H in register 40a. As another example, RNB will indicate when the first two pixels of row$_{i+2}$ have been shifted into locations F and Z in register 40a. Row$_{i+1}$ pixels will be held from location G in register 40a through E in register 40c; row$_i$ pixels from P in register 40c through D in register 40e; and row$_{i-1}$ pixels from C through W in register 40e. In this example, the RNB boundary signal will cause the PVS logic circuit 43 to substitute the inverted value of P for the pixel values stored at positions Z, F, Y, E, D, and X of the PLW registers 40. The valid and substituted pixel values are provided, in the proper order, by the PVS logic circuit 43 to the address (A) port of the PL PROM 44.

A pixel label selection signal corresponding to the label selected according to the above-described algorithm is stored at the location addressed by the original and substituted values forwarded by the PVS logic circuit 43 to the PL PROM 44. It should be evident that, with the inverted value of P substituted for the invalid pixels, the invalid pixels will not affect the selection of a label for P.

Figure 6:
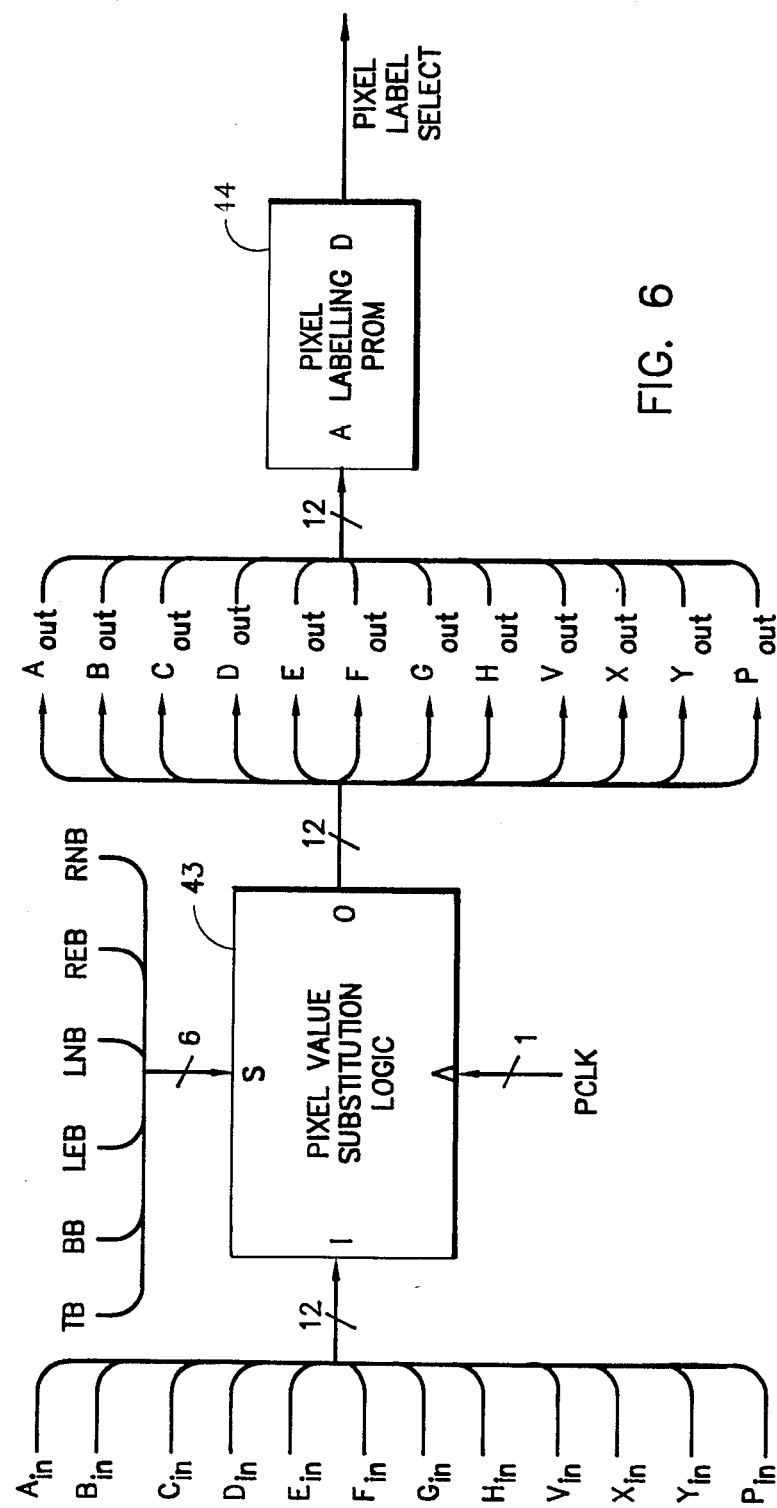
FIG. 6 is a partial block diagram illustrating in greater detail the interconnection of pixel value substitution logic between a set of image window registers and a pixel labeling circuit.

The interconnection of the PVS logic circuit 43 between the PLW registers 40 and the PL PROM 44 is illustrated in greater detail in FIG. 6. In the preferred embodiment, the inventors have embodied the functions of the PVS logic circuit 43 in a programmable logic array (PLA) that receives as inputs the six boundary signals and the twelve IWP values from the PLW registers 40a, 40c, and 40e. The boundary signals are provided through a select (S) port of the logic circuit 43; the IWP values from the PLW registers are provided through an input (I) port; and the PCLK signal is fed through a clock port.

Programmable array logic is well understood in the art. A programmable logic device such as the PVS logic circuit 43 is capable of being programmed to perform functions in response to a varying set of input conditions. In the invention, the PVS logic circuit 43 is programmed to execute in response to the boundary signals by operating on the IWP's in a manner corresponding to the pseudo-Pascal code presented in Table II.

TABLE II

| PIXEL VALUE SUBSTITUTION PROCEDURE |
|---|
| /* Initially assume condition 15 exists (no boundary signals active) and make the following direct assignments */ |
| $A_{out} := A_{in};$ |
| $B_{out} := B_{in};$ |
| $C_{out} := C_{in};$ |
| $E_{out} := D_{in};$ |
| $F_{out} := E_{in};$ |
| $G_{out} := F_{in};$ |
| $H_{out} := H_{in};$ |
| $V_{out} := V_{in};$ |
| $X_{out} := X_{in};$ |
| $Y_{out} := Y_{in};$ |
| $P_{out} := P_{in};$ |
| /* Now, as boundary signals are activated, substitute appropriate pixels in the following way */ |
| If LEB then |
| begin |

TABLE II-continued
PIXEL VALUE SUBSTITUTION PROCEDURE

```
                    V_out: = -P;
                    B_out: = -P;
                    A_out: = -P;
                    H_out: = -P
end
else if LNB then
                    V_out: = -P;
if RNB then
begin
                    X_out: = -P;
                    Y_out: = -P
end
else if REB then
begin
                    X_out: = -P;
                    Y_out: = -P;
                    D_out: = -P;
                    E_out: = -P;
                    F_out: = -P
end;
if TB then
begin
                    B_out: = -P;
                    C_out: = -P;
                    D_out: = -P;
                    X_out: = -P
end;
if BB then
begin
                    H_out: = -P;
                    G_out: = -P;
                    F_out: = -P
end.
```

In Table II, the PVS logic 43 initially assumes that condition 15 exists, that is that P is not adjacent any of the image boundaries; in this case, the PVS logic circuit 43 will simply assign to the output pixels ($A_{out}$-$P_{out}$) the pixel values for the corresponding IWP's provided by the PLW registers 40 ($A_{in}$-$P_{in}$).

Next, as the boundary signals provided by the comparators 45c and 46c are activated, that is as pixels adjacent the above-defined boundaries of the raster-scanned image are labeled, the undefined pixels in the PLW are neutralized by substitution of the inverted P value for the values of corresponding invalid pixels. In this regard, when P is on the left extreme boundary, LEB is activated and the portion of the pseudo-code listing headed "IF LEB then" causes —P, the inverted value of P, to be substituted into the window neighbors overlaying undefined pixels. In the left extreme boundary case, these neighbors are A, B, H, and V.

The procedure of Table II also provides for label selection of corner pixels by permitting assignment of the inverted P value in the extent that a vertical and a horizontal boundary signal are concurrently activated.

Alternative approaches to altering the labeling algorithm embedded in the PL PROM 44 are possible in light of the above teachings. For example, it would be possible to encode the six BOUNDARY SIGNALS into a 4-bit boundary condition signal and feed the boundary condition signal directly to the PL PROM 44. This, however, would require increasing the size of the PROM by a factor of 16.

Figure 7A:
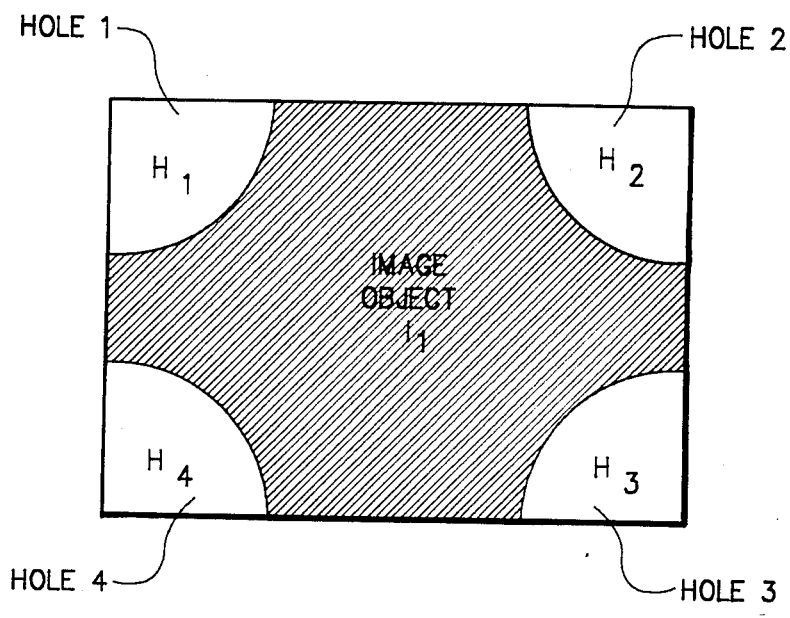
FIGS. 7A and 7B illustrate correct and incorrect labeling of image object pixels.
Figure 7B:
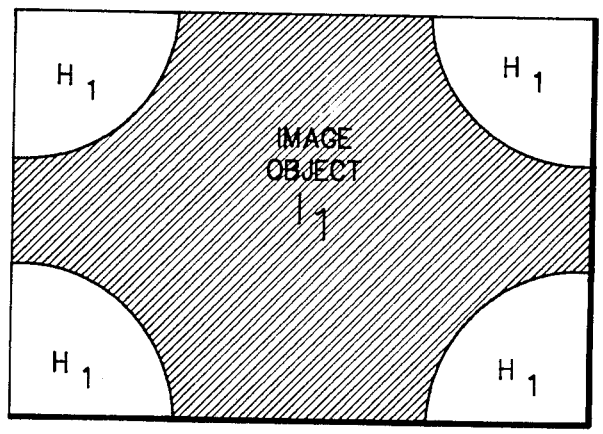

Another, erroneous approach, deceptively attractive in its simplicity, would be to pad the image frame with undefined pixels having a predetermined value, for example 0 or 1. Such padding would be made possible by altering the Table II procedure to assign the predetermined value to the undefined pixels indicated by a respective BOUNDARY SIGNAL. Such padding would effectively surround the border of the raster-scanned image with an enclosure of identically-valued undefined pixels. However, as illustrated in FIG. 7A and 7B this could lead to incorrect labeling of valid image pixels. In FIG. 7A a labeled image consisting of an object and four holes is illustrated. Proper labeling will assign the connected pixels of the object the pixel label $I_1$, while the pixels of each of the holes would bear labels significating that the holes are different. If the undefined pixels surrounding the FIG. 7A image were arbitrarily assigned the value 0, and the component labeling algorithm described above were followed, the result would be to label all the holes identically as illustrated in FIG. 7B.

It is therefore manifest that the disclosed invention enhances image inspection applications employing connectivity analysis by component (pixel) labeling. The enhancement results from responding dynamically to the changing border of a raster-scanned image and acting to suppress the potentially ambiguous effect of undefined boundary pixels in the labeling of image pixels adjacent the border. It should be evident that the proper labeling of boundary pixels according to the invention enables the analysis of images that are larger than an available viewing frame. The solution to the boundary value problem provided by the invention limits the size of memory required to support a component labeling system by minimizing the size of the pixel labeling PROM 44.

Finally, the apparatus of the invention, with proper selection of circuitry, can perform the required operations rapidly and automatically. The boundary condition is defined and a pixel is analyzed and labeled within the one cycle of the pixel clock during which the pixel is held at the P location of the PLW register.

It should be obvious that variations of the disclosed invention are possible in light of these teachings. It is therefore to be understood that, within the scope of the appended claims, the invention may be practiced otherwise than as specifically described.

We claim:

1. In a method of labeling the components of a black/white raster-scanned image frame in which the color of a component to be labeled is analyzed with respect to the colors of its causal neighbors contained in a fixed-sized window and components are labeled sequentially in response to a color valve match analysis of a sequence of windows, the improvement comprising:

identifying a frame boundary in a fixed-sized window, said frame boundary including undefined neighbor components of the component being analyzed for labeling; and in response to said identification and to the color value of the component being analyzed, substituting the inverse of the color value of the component being analyzed in the places of said undefined neighbor components.

2. The method of claim 1 wherein said step of identifying includes identifying a first boundary, said first boundary including a sequence of undefined components outside of said image frame and adjacent an edge of said image frame.

3. The method of claim 2 wherein said step of identifying further includes identifying an extreme boundary, said extreme boundary including a second sequence of undefined components outside of said image from and separated by said first boundary from said edge.

4. The method of claim 1 wherein said step of identifying includes identifying respective intersecting boundaries in said window.

5. In a system for sequentially labeling the pixels of a black/white raster-scanned frame image in response to the color values of pixels contained in a sequence of fixed-sized windows defined in said image, the improvement comprising:
   a boundary detection circuit which responds to said raster-scanned image frame by providing a signal identifying a frame boundary contained in one of said sequence of fixed-sized windows, said frame boundary including undefined boundary pixels contained in said window; and
   a pixel value selection circuit which responds to said signal and to said color values of said pixels by assigning to said undefined pixels the inverse color value of a pixel contained in said fixed-sized window and which is next to be labeled.

6. The improvement of claim 5 wherein said frame boundary includes a sequence of undefined pixels outside of and adjacent to an edge of said raster-scanned image.

7. The improvement of claim 5 wherein said frame boundary is an extreme frame boundary, said extreme frame boundary including a first column of undefined pixels outside of said raster-scanned image and separated from an edge of said raster-scanned image by a near frame boundary, said near frame boundary including a second column of undefined pixels outside of and abutting an edge of said raster-scanned image.

8. In the analysis of a fixed-sized frame of black/white raster-scanned images, a method for connected component labeling of said frame in a sequential manner utilizing a predetermined fixed priority rule, comprising the steps:
   analyzing the connectivity of each component in each of the black/white images by assessing a color value match of each component with respect to its causal neighbors within a fixed-sized window;
   labeling each analyzed component based upon its connectivity with a connected group of components within the frame, any given component being labeled according to the fixed priority rule in the event that at least two of its causal neighbors have the same color value.
   identifying a frame boundary in a fixed-size frame, said frame boundary including undefined neighbor components of a component being labeled; and
   in response to said identification and to the color value of the component being labeled, substituting the inverse of the color value of said component being labeled in the places of said undefined neighbor components.

9. The method of claim 8 wherein said components are pixels occurring in a raster-scanned sequence synchronized by a pixel clock signal having a predetermined pixel frequency and said steps are performed for each of said pixels within the cycle of said pixel clock signal during which the pixel occurs.

10. An apparatus for sequentially analyzing the connectivity of pixels in a raster-scanned image frame according to a predetermined labeling priority rule, comprising:
    window register means responsive to a sequence of color-valued pixels that form a raster-scanned image frame for associating each pixel in said sequence to causal pixel neighbors by a fixed-sized window containing the pixel and its causal neighbors;
    labeling means responsive to each fixed-sized window for analyzing the connectivity of each pixel to other pixels in the sequence based upon a color value match of the pixel with respect to its causal neighbors and for labeling each pixel based upon its connectivity with a connected group of components within the frame;
    a frame boundary means responsive to said image frame for recognizing a frame boundary contained in a fixed-sized window, said frame boundary including undefined neighbor pixels of a pixel being labeled; and
    value substitution means connected to said window means, said frame boundary means, and said labeling means and responsive to said frame boundary recognition and to the color value of the pixel labeled for substituting the inverse of the color value of said pixel being labeled in the places of its undefined pixel neighbors.

11. The apparatus of claim 10 wherein said labeling means includes an addressable storage device having pixel label selection signals stored at locations addressed by color values of pixels in said fixed-size windows.

12. The apparatus of claim 11 wherein said fixed-size window pixel color values include said inverted values substituted in the places of undefined pixels contained in said fixed-size windows adjacent the boundaries of said image frame.

13. The apparatus of claim 10 wherein said value substitution means includes programmable logic circuitry.

* * * * *

UNITED STATES PATENT AND TRADEMARK OFFICE
CERTIFICATE OF CORRECTION

PATENT NO. : 4,791,676

DATED : December 13, 1988

INVENTOR(S) : MYRON D. FLICKNER ET AL

It is certified that error appears in the above-identified patent and that said Letters Patent is hereby corrected as shown below:

IN THE SPECIFICATION
   Column 7, lines 33, 42, and 54, please delete "0" and insert therefor --1--;
   Line 47, please delete "5"; and
   Lines 67-68, please delete the passage "frame or the immediately preceding or succeeding".
   Column 8, line 1, please delete "1" and insert therefor --3--;
   Line 3, please delete the passage "of the preceding iteration"; and
   Line 19, please delete "F", and "E, D,".
   Column 10, line 10, please insert --the label $H_0$,-- before "and".

IN THE DRAWINGS
   In Figure 1, please change the label "$H_3$" to --$H_2$-- and the label "$H_2$" to --$H_1$--.
   In Figure 3, please change "LABELLING" to --LABELING--.
   In Figure 4A, please change the position of the label "(P)" to the center of the center pixel in the heavy black rectangle labeled as "PLW"; please extend the lead line from the reference label "LNB" to the second column from the right; and please extend the lead line from the reference label "LEB" to the center column.
   In Figure 4B, please change the lead line from the reference label "TB Row" from the top row to the row labeled as "$ROW_1$".
   In Figure 5 on the signal line labeled "PCLK" please delete the arrow pointing into the box indicated by reference numeral 28; and please change the numeral "1" to the right of the box indicated by reference numeral 30 to --8--.
   In Figure 7A, in the lower left-hand corner, please change the label "$H_4$" to --$H_3$-- and the reference label "HOLE 4" to --HOLE 3--; and in the lower

UNITED STATES PATENT AND TRADEMARK OFFICE
CERTIFICATE OF CORRECTION

PATENT NO. : 4,791,676

DATED : December 13, 1988

INVENTOR(S) : Myron D. Flickner et al

It is certified that error appears in the above-identified patent and that said Letters Patent is hereby corrected as shown below:

right-hand corner, please change the label "$H_3$" to --$H_4$--, and change the reference label "HOLE 3" to --HOLE 4--.

Signed and Sealed this

Tenth Day of October, 1989

Attest:

DONALD J. QUIGG

Attesting Officer

Commissioner of Patents and Trademarks